(12) United States Patent
Mackinnon

(10) Patent No.: US 7,086,807 B2
(45) Date of Patent: Aug. 8, 2006

(54) SUBSEA CONNECTION APPARATUS

(75) Inventor: Calum Mackinnon, Aberdeen (GB)

(73) Assignees: Technip SA (FR); Technip Offshore UK Limited (GB)

( * ) Notice: Subject to any disclaimer, the term of this patent is extended or adjusted under 35 U.S.C. 154(b) by 0 days.

(21) Appl. No.: 10/497,066

(22) PCT Filed: Nov. 29, 2002

(86) PCT No.: PCT/IB02/05739

§ 371 (c)(1),
(2), (4) Date: Aug. 23, 2004

(87) PCT Pub. No.: WO03/048620

PCT Pub. Date: Jun. 12, 2003

(65) Prior Publication Data

US 2004/0258482 A1    Dec. 23, 2004

(30) Foreign Application Priority Data

Dec. 1, 2001    (GB) ................................ 0128829.9

(51) Int. Cl.
*F16L 1/00* (2006.01)
*B63C 11/00* (2006.01)

(52) U.S. Cl. ...................... 405/170; 405/158; 405/173; 405/188; 405/189; 166/347

(58) Field of Classification Search ............. 405/154.1, 405/158, 170–173, 184.4, 188, 189; 166/342–344, 166/347–349

See application file for complete search history.

(56) References Cited

U.S. PATENT DOCUMENTS

| 4,382,717 A |   | 5/1983 | Morrill |
|---|---|---|---|
| 4,436,449 A | * | 3/1984 | Smoot et al. ............... 405/158 |
| 4,459,065 A | * | 7/1984 | Morton ....................... 405/171 |
| 4,591,292 A |   | 5/1986 | Stevens et al. ............. 405/169 |
| 4,906,136 A | * | 3/1990 | Norbom et al. ............. 405/169 |
| 5,593,249 A |   | 1/1997 | Cox et al. |
| 5,730,551 A | * | 3/1998 | Skeels et al. ............... 166/347 |

(Continued)

FOREIGN PATENT DOCUMENTS

EP    0 296 137    5/1991

(Continued)

OTHER PUBLICATIONS

International Search Report dated Apr. 4, 2003.

*Primary Examiner*—Jong-Suk (James) Lee
(74) *Attorney, Agent, or Firm*—Ostrolenk, Faber, Gerb & Soffen, LLP

(57) ABSTRACT

Apparatus for connecting a conduit to a subsea structure includes a frame connectable to the subsea structure by a docking mechanism, a conduit handling mechanism on the frame to facilitate positioning of the conduit for attachment to the subsea structure and a second docking mechanism for attaching a mobile manipulating device to the frame. In use, the mobile manipulating device connects to the conduit by means of a pull-in rope on a winch, and travels under its own power to the subsea structure while paying out the pull-in rope. There, it docks with the frame and the pull-in rope is reeled in by the winch on the mobile manipulating device. The conduit is then connected to the subsea structure by the conduit handling mechanism on the frame. The invention also includes the method of attaching a conduit to a subsea structure using the described apparatus.

20 Claims, 12 Drawing Sheets

U.S. PATENT DOCUMENTS

| | | | |
|---|---|---|---|
| 6,022,421 A * | 2/2000 | Bath et al. | 134/8 |
| 6,024,514 A * | 2/2000 | Ostergaard | 166/343 |
| 6,234,717 B1 * | 5/2001 | Corbetta | 405/170 |
| 6,481,504 B1 * | 11/2002 | Gatherar | 166/344 |
| 6,503,021 B1 * | 1/2003 | Corbetta | 405/170 |

FOREIGN PATENT DOCUMENTS

| | | | |
|---|---|---|---|
| GB | 2 323 907 | 10/1998 | |
| GB | 2 343 493 | 5/2000 | |
| GB | 2 347 183 | 8/2000 | |
| JP | 05065977 | * 3/1993 | 405/170 |

* cited by examiner

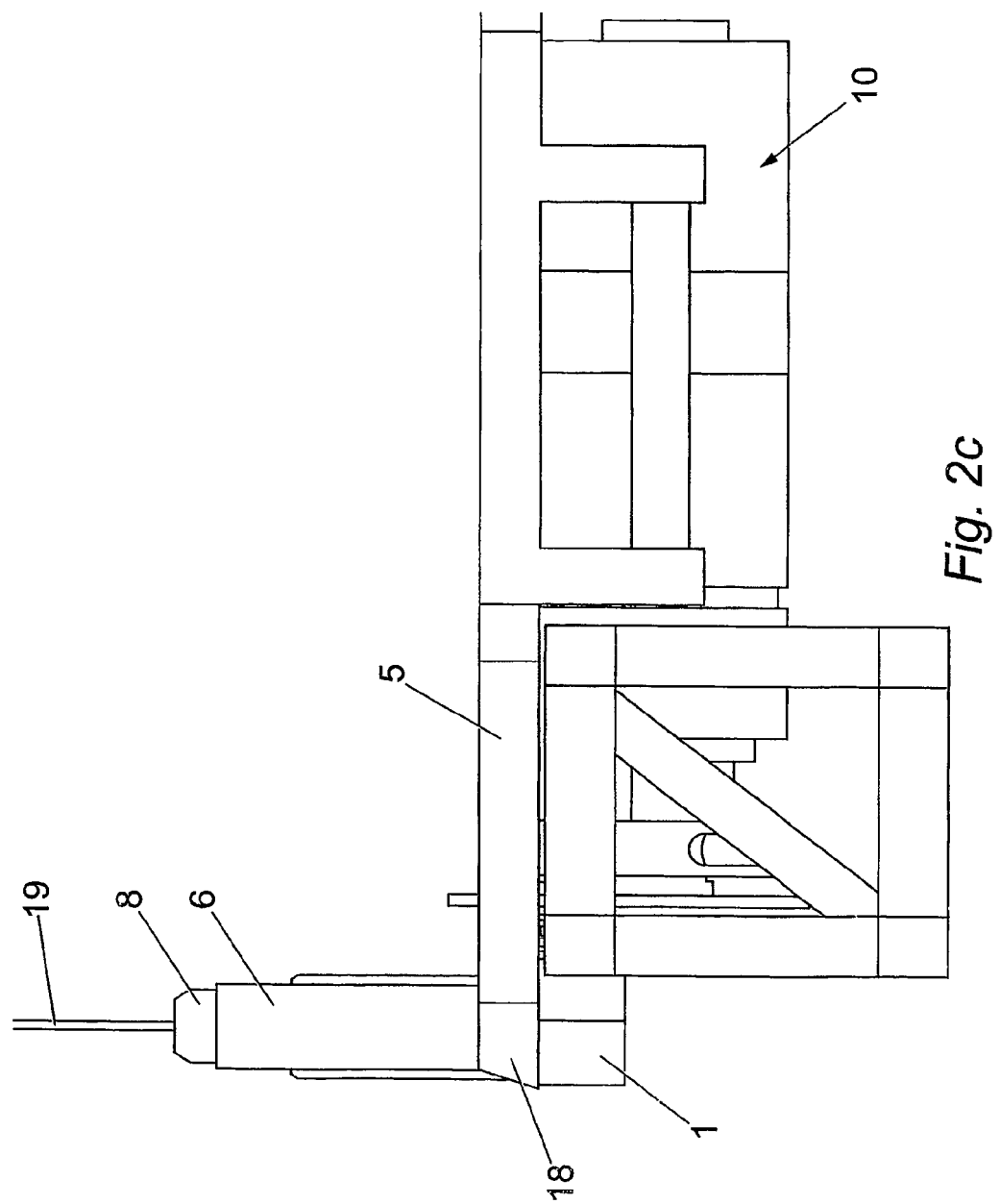

SUBSEA CONNECTION APPARATUS

The present invention is a subsea connection apparatus which can be used to assist in the subsea connection of flexible or rigid flowlines and umbilicals or bundles (hereinafter referred to as conduits) to subsea structures.

One of the most complex and expensive tasks required to be undertaken by means of diverless intervention is that of connecting conduits to subsea structures. In order to make the connection the conduit must be manoeuvred into position at the subsea structure in a controlled manner to ensure proper connection of the conduit to the subsea structure. This connection can be made during conduit laying operations by means of a vertical connection which uses a surface vessel to position the end of the conduit onto a structure connection clamp. In this type of On-structure deployment, vertical heave of the vessel can cause damage to the connection points on the subsea structure and conduit; this is a particular problem in stormy weather. In addition, this technique requires the use of a complicated subsea porch structure and an additional component on the end of the conduit.

Where a conduit is deployed to the seabed with an end termination head at some time prior to connection, the technique is called On-seabed connection. In such cases, the conduit is pulled to the subsea structure after deployment on the seabed and the termination head connected to the subsea structure at a later date with a substantially horizontal connection. This type of connection is used predominantly in the North Sea or other offshore environments where the weather conditions are unpredictable. Deployment on soft seabed will result in sinkage of the conduit termination head, an increase in pull-in loads and reduced visibility. The operation of pulling the termination across the seabed and into the connection position is typically performed by a toolskid mounted onto an ROV. The ROV provides the electrical or hydraulic power, and buoyancy to allow it to support the toolskid and the termination head of the conduit.

The conduit may be pulled to subsea structures by docking an ROV and toolskid onto the conduit termination head then flying the termination head to the subsea structure along guide ropes previously connected to the subsea structure, using a winch and the ROV thrusters. The ROV and toolskid then dock on the subsea structure and connect the conduit to the structure.

On-seabed connection becomes very difficult in deep water. Whilst it is possible to use known, standard ROVs and toolskids up to a depth of 600 m, new designs of ROV and toolskid are required for deployment in deep water because the toolskids must be larger and more powerful, to cope with the increased hydrostatic pressure and higher pull-in and alignment loads. Furthermore, as depth increases, data transmission becomes slower and more difficult, and the consequent delay means that operation ROV is more difficult to control.

The main problems in providing conduit connection are related to either guiding the pipeline to the subsea structure or to the resistance of the load that occurs in deep water.

In accordance with the present invention there is provided a subsea connection apparatus comprising: a frame connectable to a subsea structure; docking means for connecting the frame to the subsea structure; conduit handling means positioned on the frame to facilitate the positioning of a conduit for attachment to a subsea structure; and means for docking a subsea tool and/or vehicle onto the frame.

Preferably, the frame is removably connectable to the subsea structure.

Preferably, the apparatus is further provided with aligning and guiding means for aligning a conduit while it is handled by the handling means.

Preferably, the apparatus is further provided with guide means for guiding the apparatus to the subsea structure.

Preferably, the guide means comprises a sleeve having a first end and a second end, the first end being cylindrical in shape and the second end being frustoconical in shape. The sleeve is designed to co-operate with docking means located on the subsea structure.

Optionally, the apparatus is provided with connection means to which a support cable is fitted. This supports the weight of the apparatus as it is lowered towards the seabed.

Preferably, the frame has a first end or work area and a second end or handling area adjacent to the work area.

Preferably, the work area is adapted to allow an ROV to perform a Stroke-in operation on a conduit.

Preferably, the apparatus is provided with means to increase its buoyancy.

Preferably, the frame is designed to support some or all of the mechanical and hydrostatic load associated with connecting a conduit to the subsea structure.

Preferably, the frame is provided with a latch, the latch being connectable to a conduit to allow the conduit to be supported by the frame in a position adjacent to the frame.

Embodiments of the present invention will now be described by way of example only with reference to the accompanying drawings of which:

FIG. 2b is a side view of the present invention being guided towards a subsea structure and FIG. 2c is a side view of the present invention docked with a subsea structure;

Figure 5A:
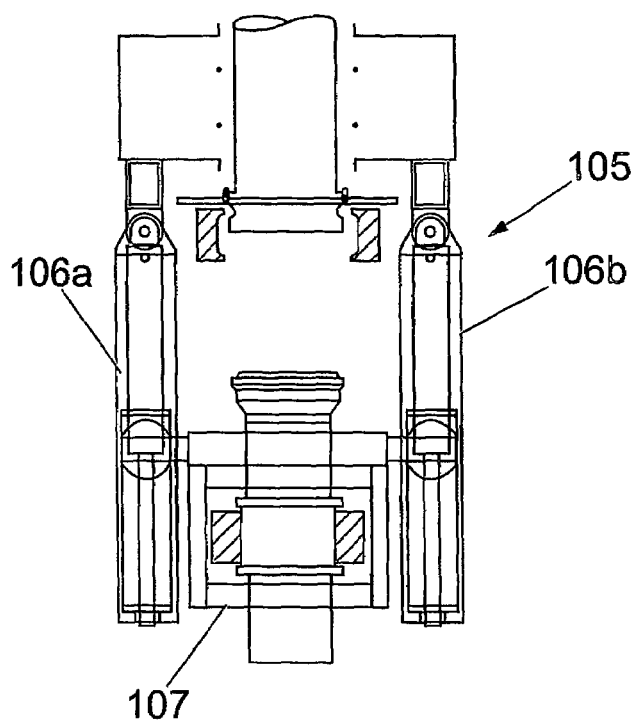
Figure 5B:
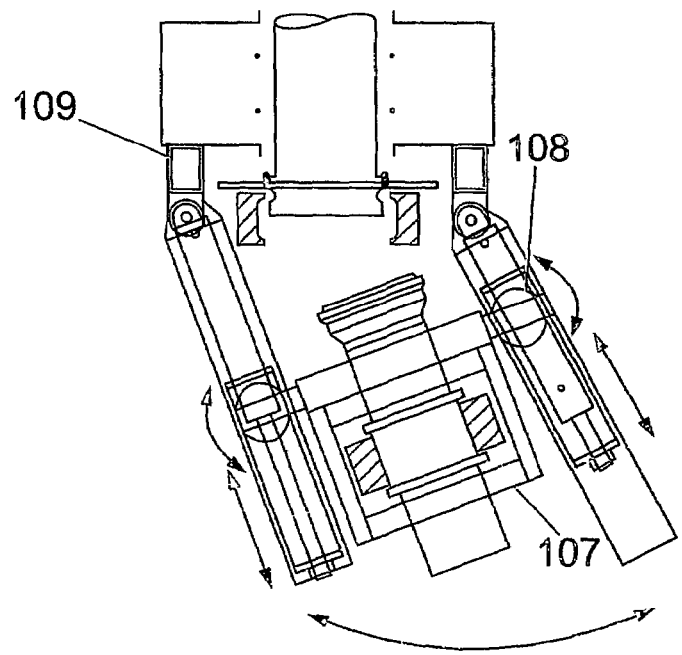
Figure 5C:
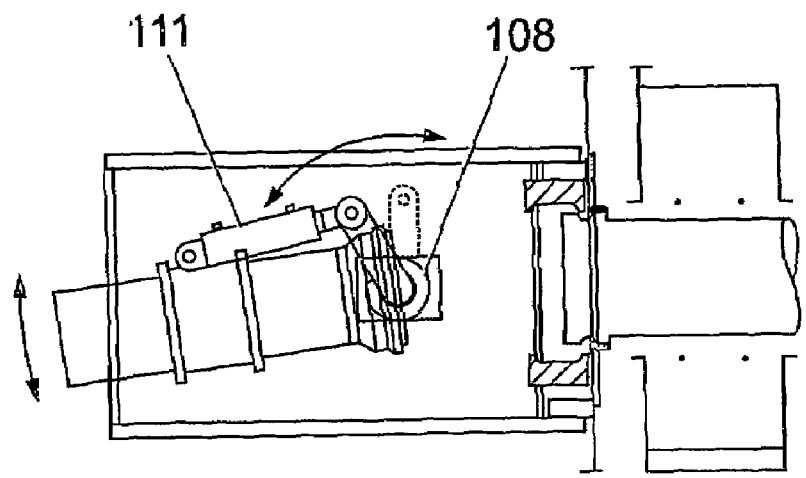
Figure 5D:
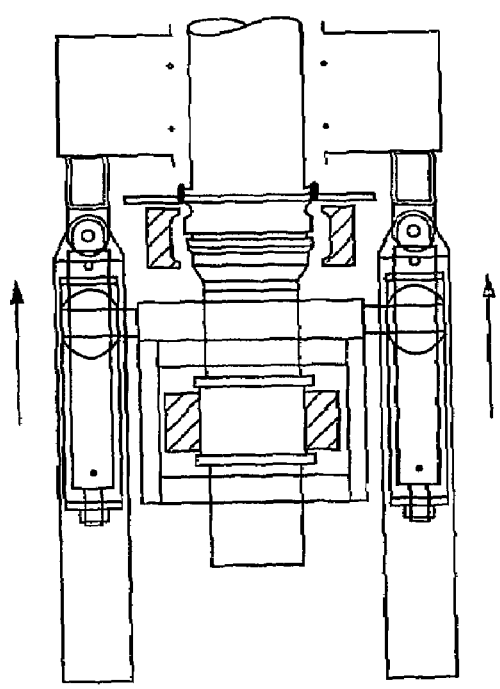

FIGS. 5a to 5d illustrate another embodiment of the subsea connection apparatus according to the invention. FIGS. 5a and 5b are plan views of the frame and the termination end of the conduit during alignment operations. FIG. 5c is a side view of an alignment operation. FIG. 5d is a plan view after the stroke-in of the conduit, i.e. after the conduit has been moved into its final position, ready for clamping to the subsea structure.

The apparatus of the present invention has been designed for connection to a subsea structure and is capable of bearing some or all of the load associated with connection of a conduit to a subsea structure. In many cases, these loads were previously borne at least in part by an ROV and/or a toolskid. It allows the simplification of the design of the ROV and the toolskid structure so that they can perform connection in deep water. In preferred embodiments, the apparatus of the present invention is capable of bearing at least 75% of these loads.

Figure 1:
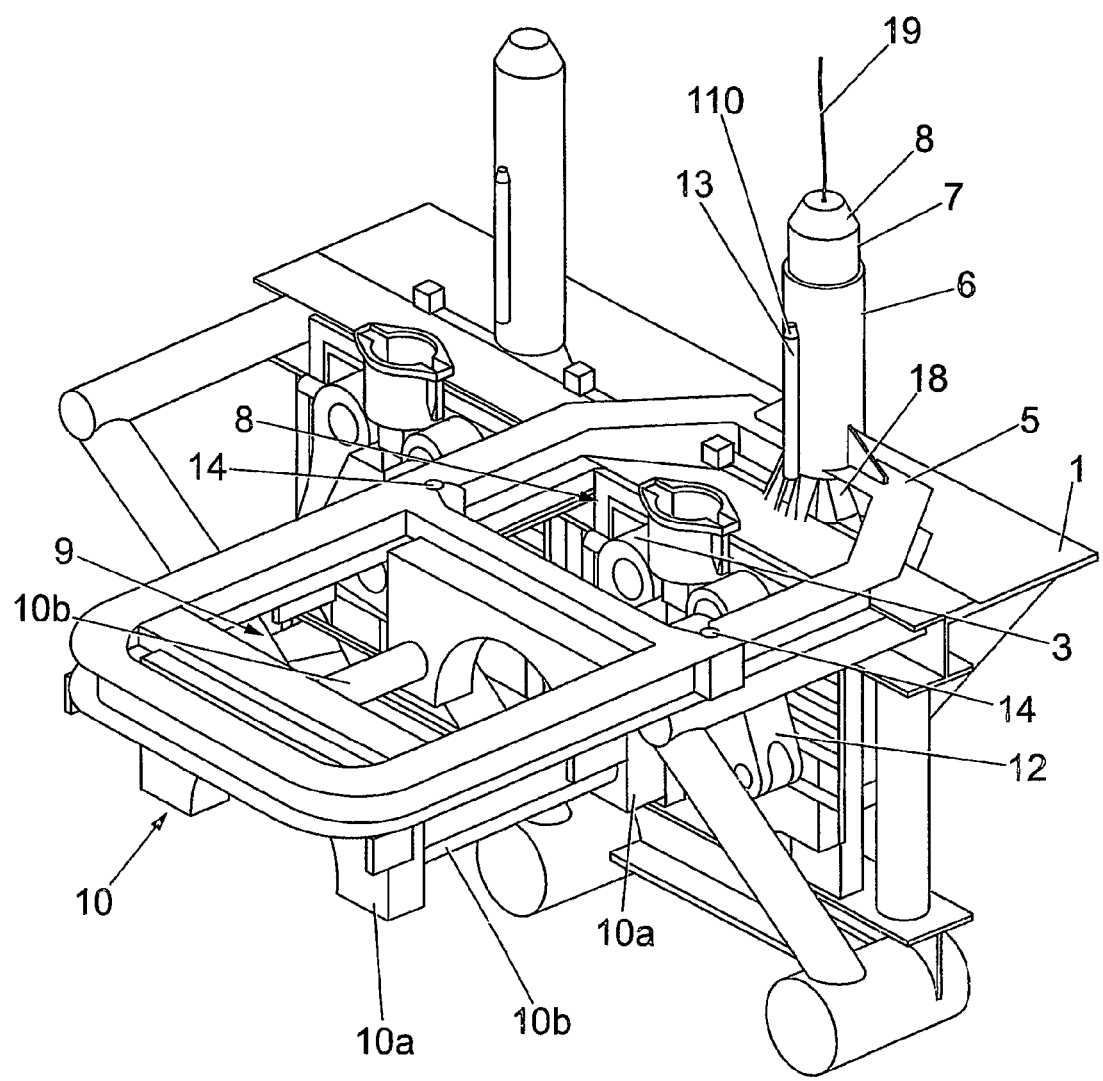
FIG. 1 is a perspective view of an embodiment of the present invention.

FIG. 1 is a perspective view of the present invention. Details of the frame 5 and the other components of the apparatus will be described with reference to FIG. 1.

FIG. 1 shows the frame 5 which defines a work area 8 arranged, in use, beside the subsea structure 1. The work area 8, is designed to allow an ROV with a toolskid to perform a Stroke-in operation on a conduit and to facilitate clamp operations such as seal replacement, seal area inspection and cleaning, clamp opening and closing, external seal testing and clamp removal and replacement. Handling area 9 is also defined by the frame 5 and is located remote from the subsea structure, in use, and provides access to the area on the subsea structure 1 where the termination head of the pipe will be handled.

Situated below the handling area 9 are conduit handling means 10, as shown in FIG. 1. The handling means has two handling members, 10a, each having an internal surface shaped to receive a conduit. The handling members are connected together by support means 10b. The docking frame 5 can be provided with aligning and guiding means in order to be able to align the termination head of the conduit, while it is handled by the handling means, with the connection hub of the subsea structure. These means allow the guiding of the conduit to a working position where the termination head is aligned with the subsea structure's connection point and only a final stroke-in operation has to be performed. These means can be actuated by the ROV and its toolskid, most of the loads generated by this operation shall be transferred directly to frame 5. Interfaces 14, as shown in FIG. 1 are incorporated in the frame 5 to provide means for docking the toolskid on the frame. The interfaces 14 of the frame also co-operate with docking pins (not shown) of a toolskid which can be connected to the frame 5 to pull a conduit to the subsea structure's connection point or to perform a stroke-in operation.

FIG. 1 shows the frame 5 located on a subsea structure above a connection point which is located below the central actuation means 12. The connection point is provided with a clamp 3 that contains a central actuation mechanism 12 and a horizontal leadscrew which allows for a very narrow clamp width of the subsea connection clamp 3.

In addition, the embodiment of FIG. 1 shows a frame 5 which is provided with docking means to allow it to be removably connected to the subsea structure 1. In addition, in this example, the docking means of the frame contains guide means in the form of a docking sleeve 6 which is connectable to a guide pin 7 located upon the subsea structure. The guide pin 7 has a frustoconical end 8 which co-operates with the first end 18 of the docking sleeve 6 to connect with the guide pin.

The guide pin 7 is also provided with pins 13 which co-operate with slots in the side of the docking sleeve 6 to ensure the correct orientation of the frame 5 with respect to the subsea structure. The docking frame 5 may be deployed from the surface on a centralised guide cable 19 extending from a vessel on the surface through the sleeve 6 to the guide pin 7 on the subsea structure 1 for engagement with the guide pin 7.

Figure 2A:
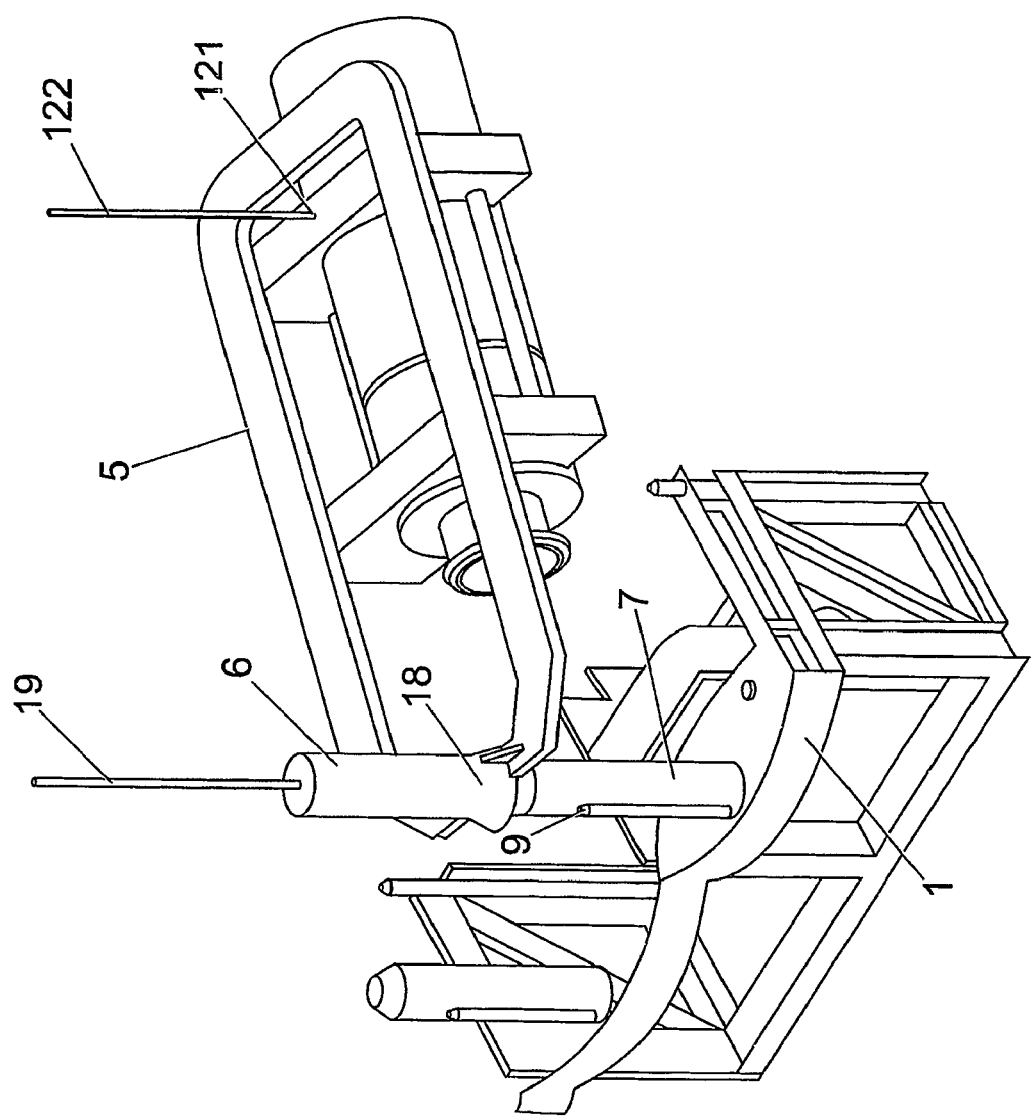
FIG. 2a is a perspective view of the embodiment of the present invention of FIG. 1 being guided towards a subsea structure.
Figure 2B:
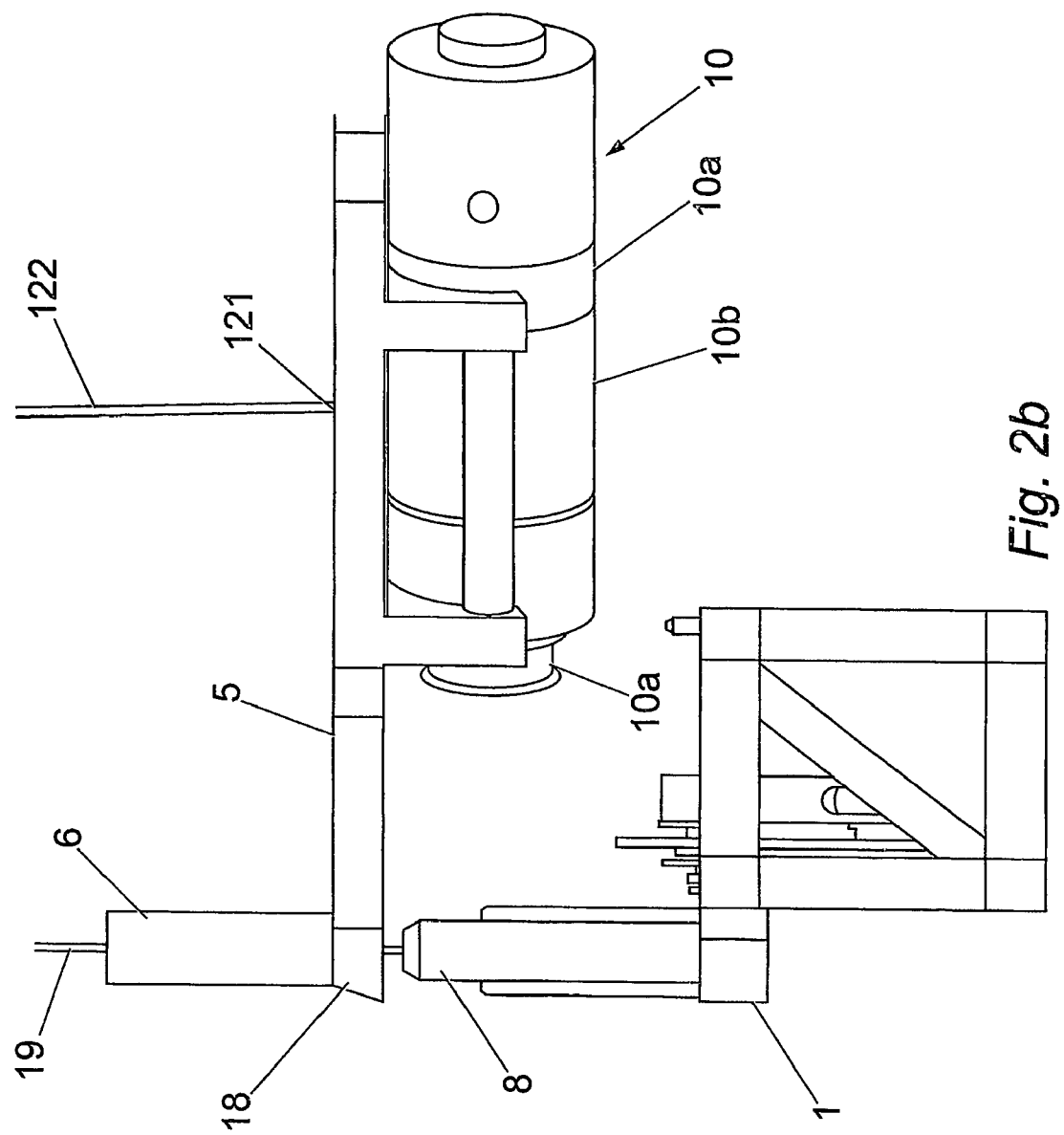
Figure 3A:
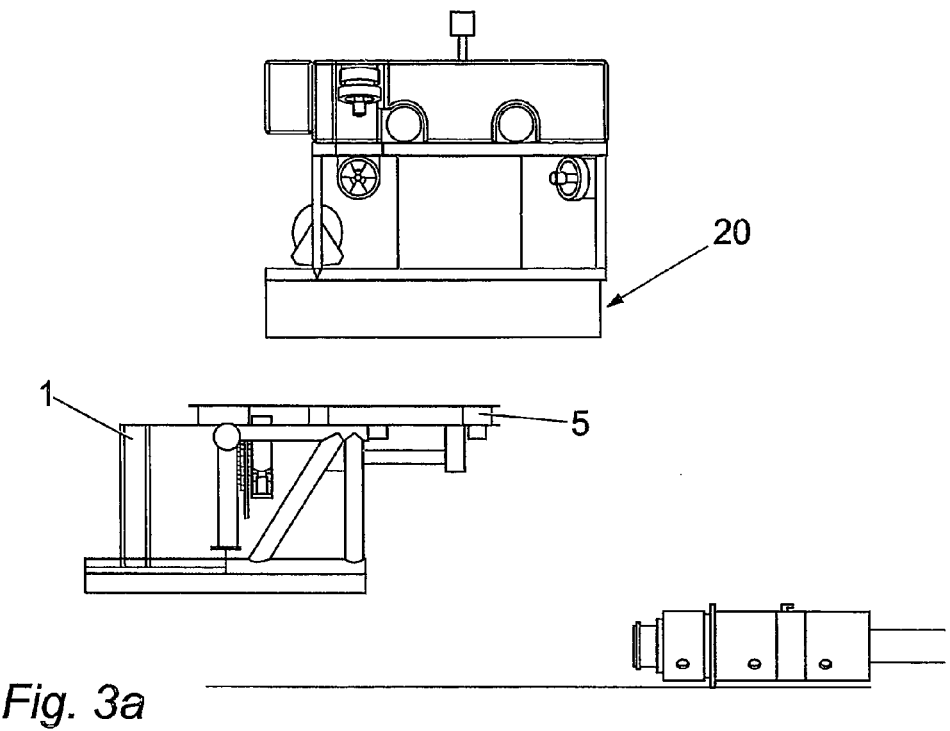
FIGS. 3a to 3f illustrate the use of the apparatus of the present invention for on-seabed conduit connection.
Figure 3B:
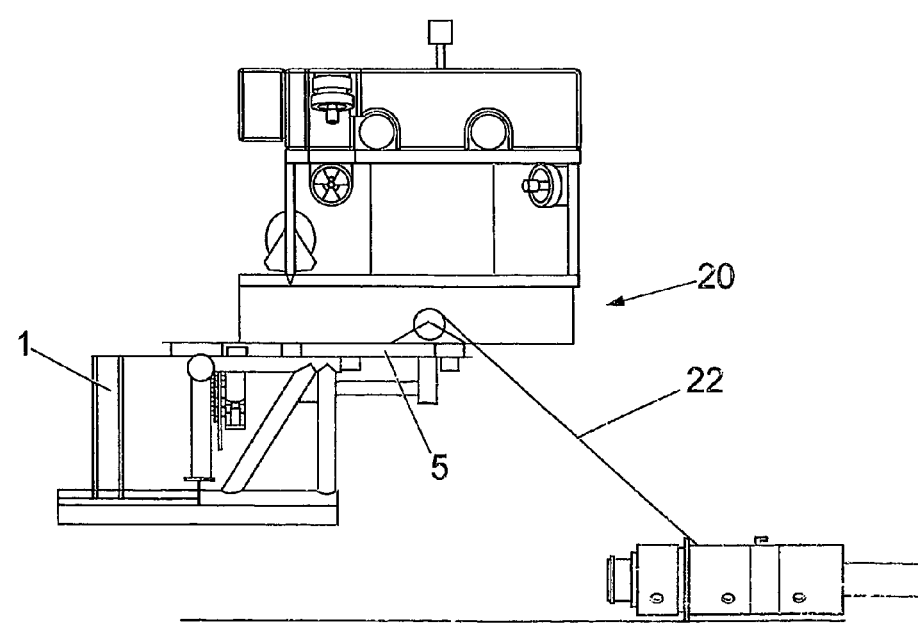
Figure 3C:
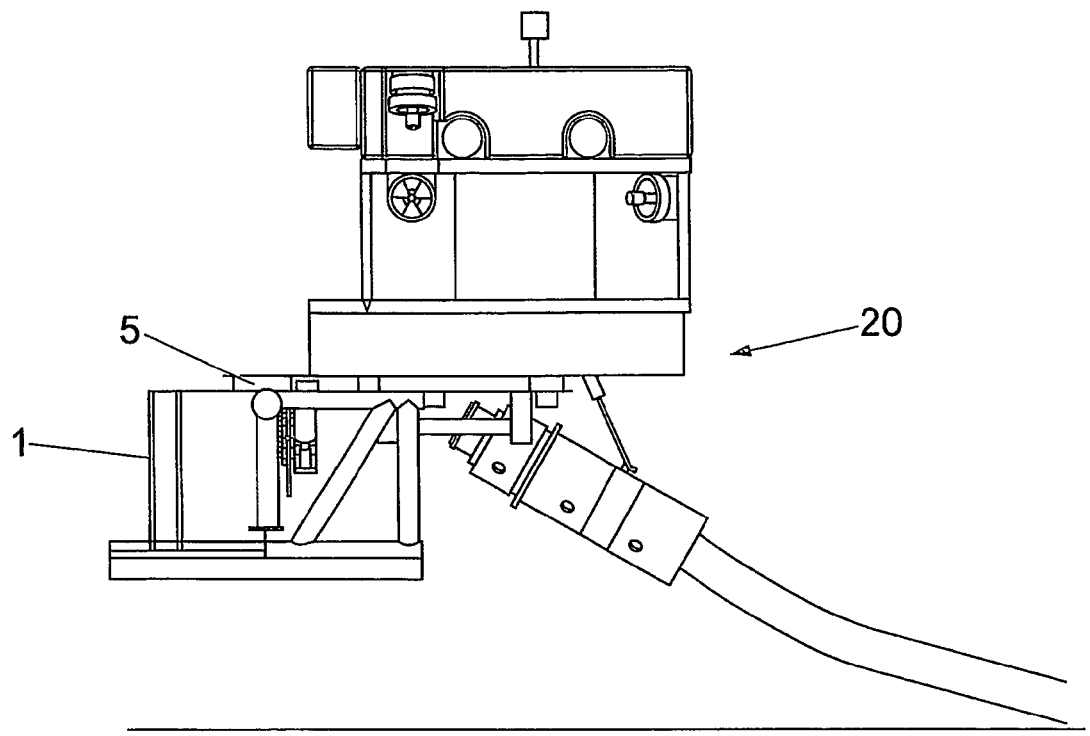
Figure 3D:
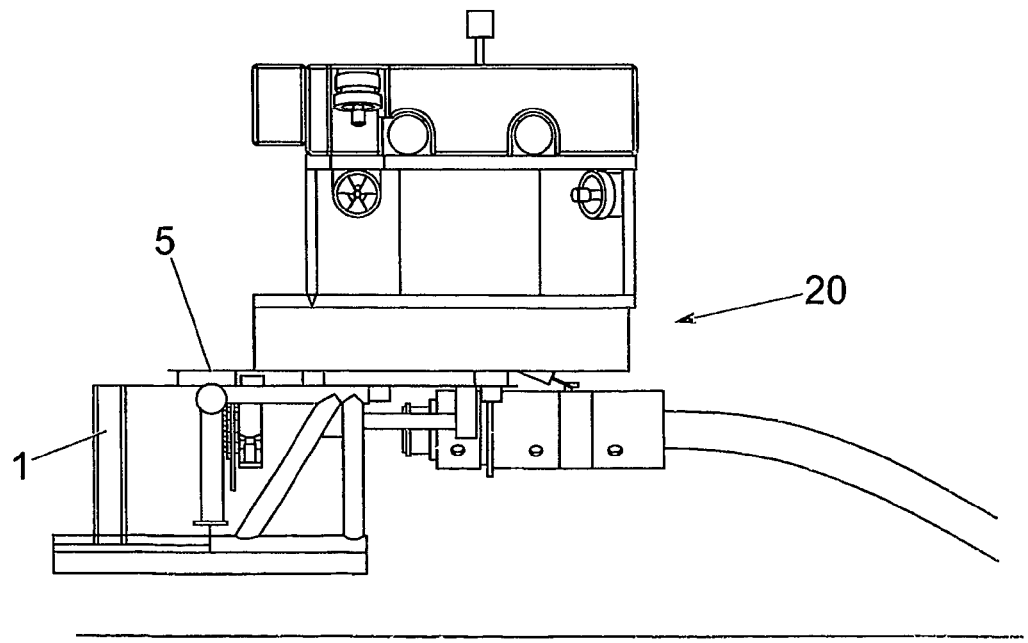
Figure 3E:
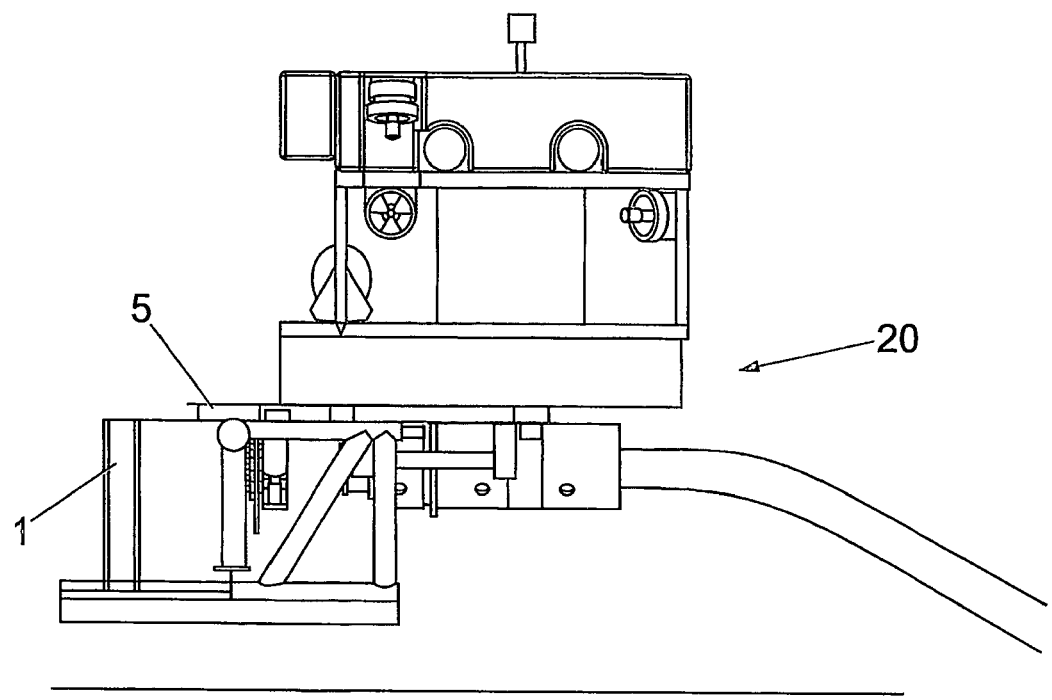
Figure 3F:
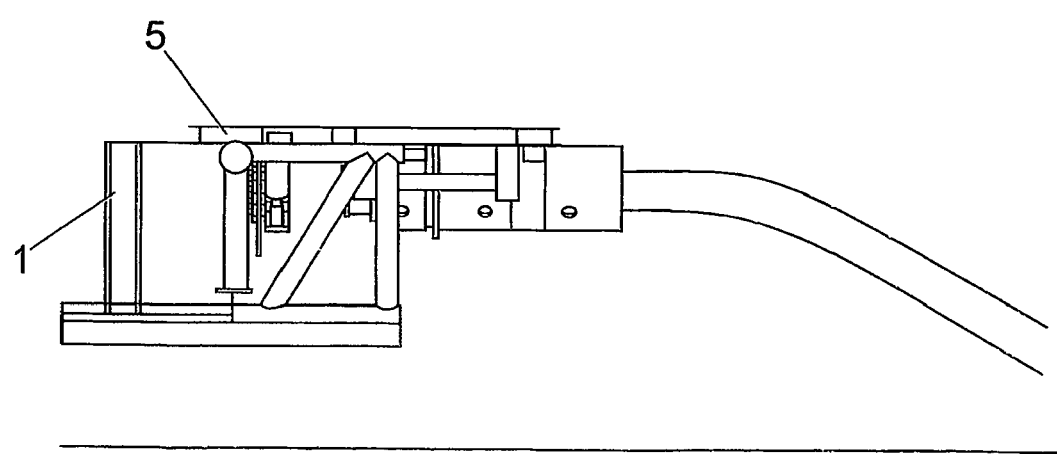
Figure 4A:
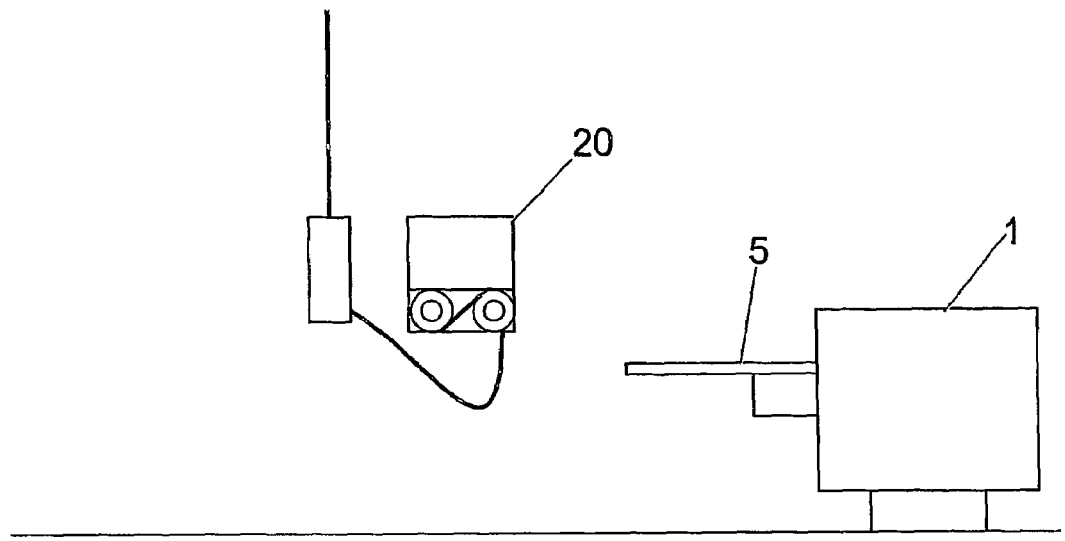
FIGS. 4a to 4f illustrate the use of the apparatus of the present invention for catenary pull-in connection.
Figure 4B:
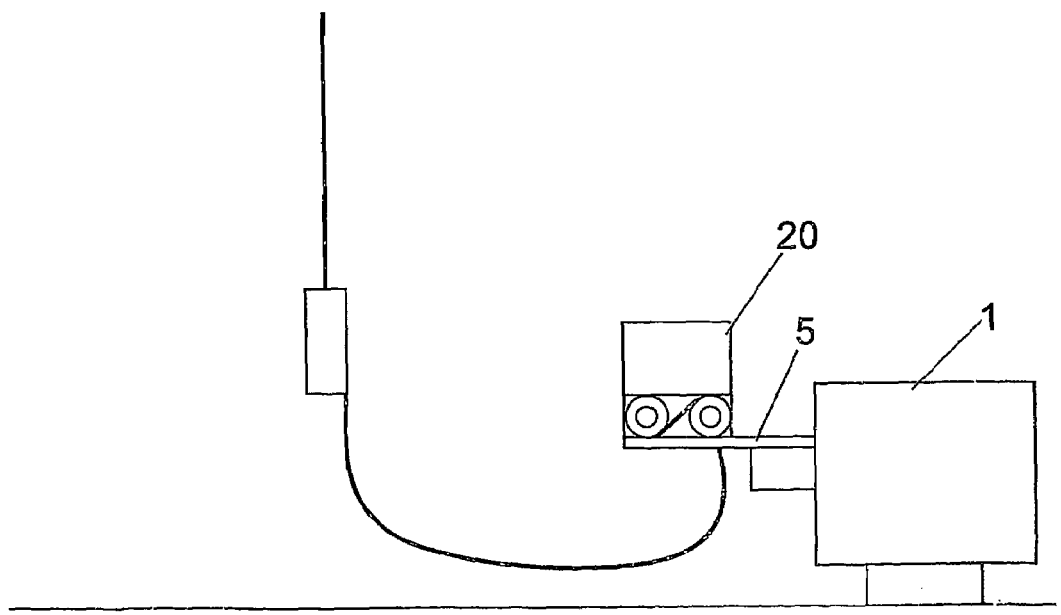
Figure 4C:
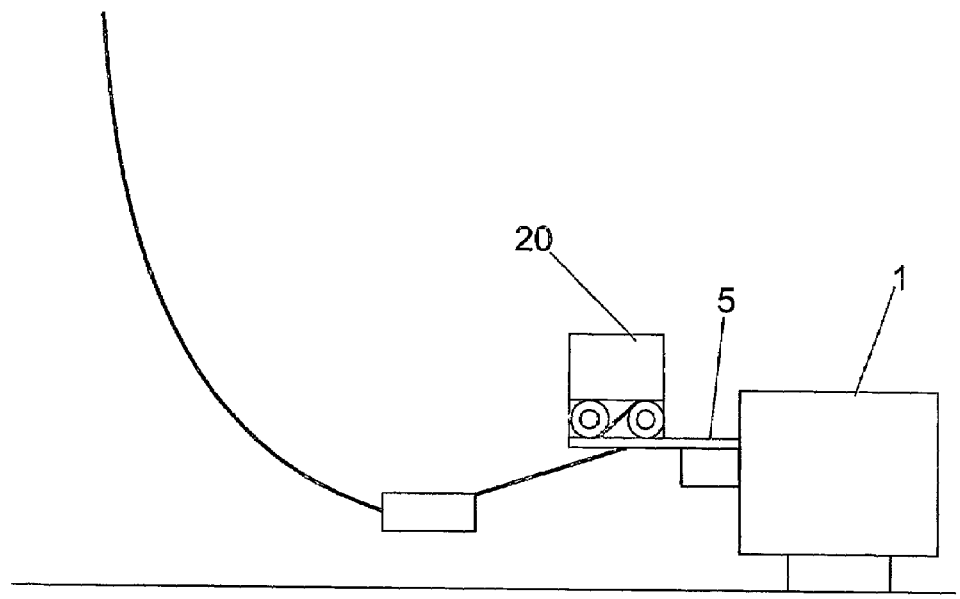
Figure 4D:
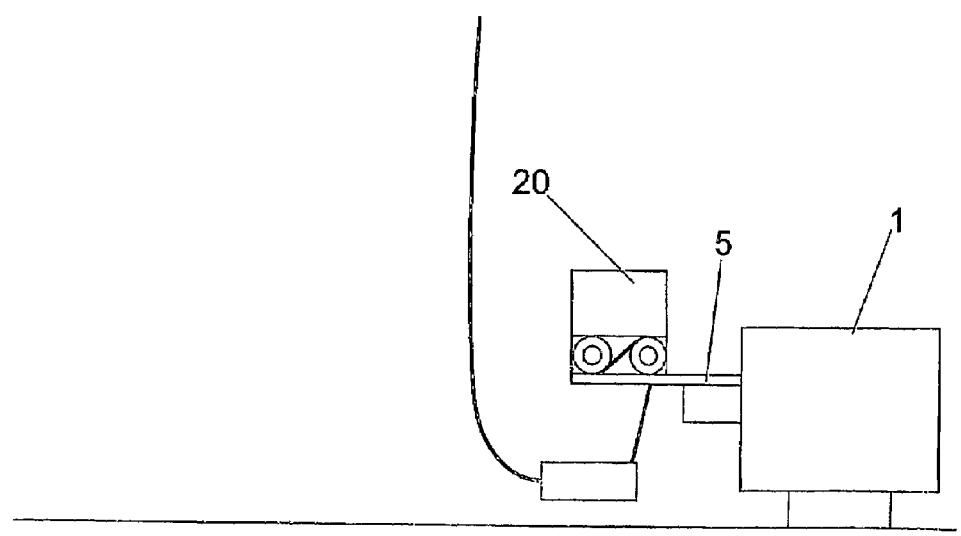
Figure 4E:
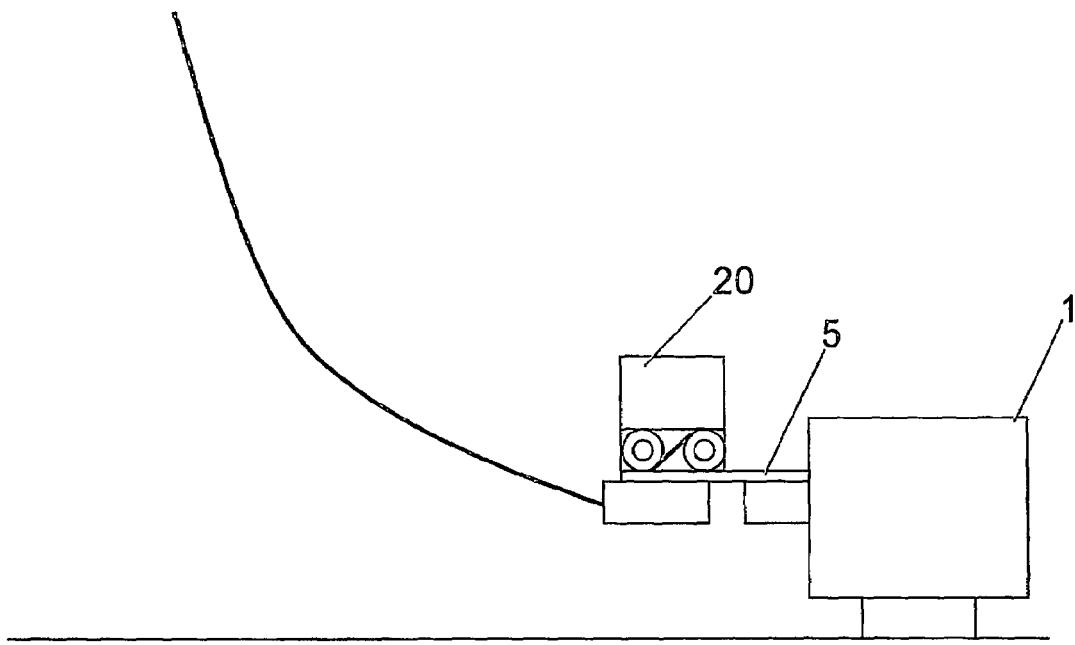
Figure 4F:
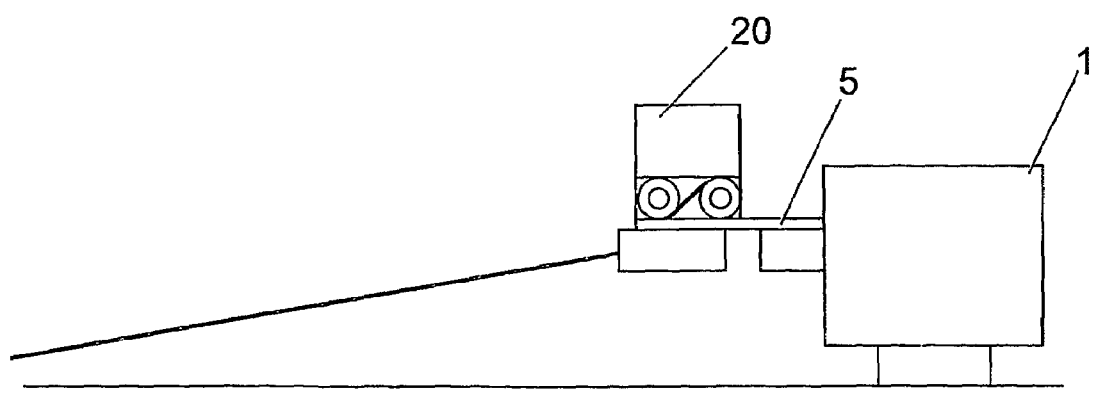

FIGS. 2a–2c show the apparatus of the present invention being lowered onto the guide pin 7 situated on the subsea structure. The frusto-conical first end 18 of the sleeve 6 provides a larger area into which the frusto-conical end 8 of the guide pin 7 can be inserted. This makes it easier to connect the apparatus to the subsea structure. The interconnection of the guide pins with secondary grooves 110 in the sleeve ensure that the apparatus is correctly orientated with respect to the subsea structure.

In addition, the frame 5 may be provided with connection means 121 to which a support cable 122 can be attached FIG. 2b. This provides support to the apparatus as it is lowered towards the seabed and is particularly useful in cases where the additional weight of the conduit termination head is contained in the handling means 10 when the apparatus and the termination head are being guided to the subsea structure from the vessel as shown in FIGS. 2a–2c. When the conduit and frame are deployed simultaneously, the conduit is in a working position so that an ROV and toolskid can perform the stroke-in operation. The frame with the conduit can be docked on the subsea structure using guide lines deployed from the vessel with the help of an ROV, if necessary.

The subsea connection apparatus can be deployed separately from the subsea structure. Separate deployment is particularly appropriate where there are size or weight limitations that preclude deployment of the frame and subsea structure together. The apparatus could be deployed on guide cables as described above or using an ROV to push the frame into the correct position for docking on the subsea structure.

Further alternatively, the docking frame could be installed by deploying the docking frame to the seabed in a basket from where it can be picked up by an ROV and installed on a seabed structure. In this case additional ROV Buoyancy may be required to enable the ROV to lift the frame or buoyancy tanks may be incorporated in the apparatus itself. In addition, smaller guide pins may be used where the frame is installed by ROV.

Typically, on seabed connection (FIGS. 3a to 3f) can be achieved using the apparatus by flying an ROV containing a toolskid 20, connecting pull-in rope 22 to the termination head of a conduit, docking the ROV and its toolskid 20 on the frame 5 and pulling the conduit to the frame using a pull-in module, aligning and guiding the conduit to its working position using the pull-in module and connecting the conduit to a subsea connection using a stroke-in module. During the pull-in and stroke-in phased of the operation, the frame bears most of the weight (typically 75%) associated with the operation.

In addition, the ROV can perform the pull-in operation and leave the termination head connected to the frame by means of a hang-off latch and the stroke-in operation can be performed separately.

In the case of the conduit to be connected during laying operation, the conduit or termination head may be suspended above the seabed. The ROV and its tool skid connects a cable to the termination head of the conduit, and then docks on the frame from where the termination head is pulled to a position below the frame using the pull-in module of the toolskid and is then connected to the subsea structure using the stroke-in module during the pipe laying operation.

FIGS. 5a to 5d show in detail a subsea connection apparatus according to the present invention. In particular these figures show in detail the conduit handling means and the guiding and aligning means for aligning the conduit while it is being handled by the handling means. The frame 105 comprises two pivotable outer slide boxes (106a, 106b) for accommodating angular displacement and a front section 109. These slide boxes are pivotable with respect to front section 109. Cylinders are provided which control the stroke-in distance, the lateral linear displacement and the angular displacement of the slide boxes and ensure the alignment of the conduit in the horizontal plane and a favourable position of the handling frame as illustrated in FIGS. 5a and 5b. The outer slide boxes support a conduit handling swivelling frame 107 which handles the termination end of the conduit. A swivel connection 108 with control cylinders 111 allows pivotable movement between the handling frame and each outer slide box and ensures the alignment in the vertical plane as illustrated in FIG. 5c. The subsea connection apparatus can be deployed onto the subsea structure using frame docking means as illustrated in the embodiment of FIGS. 2a–2c. The front frame section 109 is linked to the guide sleeve and vertical cylinders can be provided on this part to allow the front frame to move vertically relative to the subsea structure. The cylinders of the handling means, of the guiding means and of the aligning means may be actuated by a ROV docked on the front frame section 109.

It is important to note that the apparatus is able to be used for on seabed connection (FIGS. 3a–3f) for on-structure connection (FIGS. 2a–2c) or for catenary pull-in connection (FIGS. 4a–4f).

By transferring most of the operational loads to the apparatus of the present invention, it is possible to use standard ROVs and toolskids for deepwater conduit connection and it is possible to reduce the size of ROV and toolskid used for deep water applications.

Improvements and modifications may be incorporated herein without deviating from the scope of the invention.

The invention claimed is:

1. A subsea connecting apparatus for connecting a conduit to a subsea structure, the apparatus comprising:
   a frame connectable to the subsea structure;
   a first docking mechanism for connecting the frame to the subsea structure;
   a conduit handling mechanism on the frame to facilitate the positioning of a conduit for attachment to the subsea structure; and
   a second docking mechanism for releasably docking a subsea tool or vehicle onto the frame, whereby the subsea tool or vehicle, after being docked onto the frame, is operable to deliver the conduit to a position at which it is engageable by the frame,
   wherein the frame is constructed and configured to engage with the conduit in an operative relationship after the conduit has been delivered by the subsea tool or vehicle.

2. The apparatus as claimed in claim 1, wherein the frame is removably connectable to the subsea structure.

3. The apparatus as claimed in claim 1, wherein the frame further includes an aligning and guiding mechanism for aligning a conduit while it is handled by the handling mechanism.

4. The apparatus as claimed in claim 1, further including a guide mechanism for guiding the apparatus to the subsea structure.

5. The apparatus as claimed in claim 4, wherein the guide mechanism comprises a sleeve having a first end and a second end, the first end being cylindrical in shape and the second end being frustoconical in shape.

6. The apparatus as claimed in claim 5, wherein the guide mechanism is located on the frame, and is constructed to interact with a complementary guide pin on the subsea structure to form the docking mechanism.

7. The apparatus as claimed in claim 6, further including a guide cable extending from the guide pin to a surface vessel, the guide mechanism on the frame being movable along the guide cable as it is lowered for docking onto the subsea structure.

8. The apparatus as claimed in claim 1, further including a connection mechanism to which a support cable is connectable.

9. The apparatus as claimed in claim 1, wherein the frame has a first end comprising a work area and a second end comprising a handling area adjacent to the work area.

10. The apparatus as claimed in claim 9, wherein the work area is adapted to allow a subsea vehicle comprising an ROV to perform a stroke-in operation on the conduit.

11. The apparatus as claimed in claim 1, further including mechanism to increase the buoyancy of the apparatus.

12. The apparatus as claimed in claim 1, wherein the frame includes a latch, the latch being connectable to a conduit to allow the conduit to be supported by the frame in a position adjacent to the frame.

13. A method for connecting a conduit to a subsea structure, the method comprising the steps of:
   docking a frame to the subsea structure;
   operating a connecting mechanism on a subsea tool or vehicle to engage the conduit for transportation;
   operating the subsea tool or vehicle to travel to the subsea structure without interaction with the frame;
   docking the subsea tool or vehicle onto the frame;
   operating the docked subsea tool or vehicle to bring the conduit into an operative relationship with a conduit handling mechanism on the frame to facilitate the positioning of the conduit for attachment to the subsea structure; and
   operating the conduit handling mechanism to couple the conduit to the subsea structure, whereby the frame bears most of the load associated with the operations of the docked subsea tool or vehicle and the conduit handling mechanism,
   wherein the frame is constructed and configured to engage with the conduit in an operative relationship after the conduit has been delivered by the subsea tool or vehicle.

14. The method as claimed in claim 13, wherein the step of docking the frame to the subsea structure includes lowering the frame to the subsea structure along a guide cable extending from a surface vehicle to the subsea structure and engaging a sleeve on the frame with a complementary pin on the subsea structure.

15. The method as claimed in claim 13, wherein the step of operating the subsea tool or vehicle to travel to the subsea structure comprises paying out a pull-in rope while the subsea tool or vehicle travels under its own power toward the frame; and
   the step of bringing the conduit into an operative relationship with the conduit handling mechanism comprises reeling in the pull-in rope after the subsea tool or vehicle has been docked with the frame.

16. A subsea connecting apparatus for connecting a conduit to a subsea structure comprising:
   a frame connectable to the subsea structure;
   a first docking mechanism for connecting the frame to the subsea structure;
   a conduit handling mechanism on the frame to facilitate the positioning of a conduit for attachment to the subsea structure;
   a subsea tool or vehicle including a connecting mechanism operable to connect to the conduit for transportation to the frame, wherein the subsea tool or vehicle is operable to travel from a location at which it connects to the conduit to the frame under its own power without interaction with the frame or the subsea structure;
   a second docking mechanism for releasably docking the subsea tool or vehicle onto the frame, wherein:
   the subsea tool or vehicle is operable when docked to bring the conduit into an operative relationship with the conduit handling mechanism after the conduit has been delivered by the subsea tool or vehicle; and
   the frame is constructed and configured to bear most of the load associated with the operations of the docked subsea tool or vehicle and the conduit handling device.

17. The apparatus as claimed in claim 16, wherein the guide mechanism is located on the frame, and is constructed to interact with a complementary guide pin on the subsea structure to form the docking mechanism.

18. The apparatus as claimed in claim 16, further including a guide cable extending from the guide pin to a surface vessel, the guide mechanism on the frame being movable along the guide cable as it is lowered for docking onto the subsea structure.

19. The apparatus as claimed in claim 16, wherein the first docking mechanism includes a guide cable extending from a surface vehicle to a pin on the subsea structure, and a sleeve on the frame which travels on the guide cable and engages with the pin.

20. The apparatus as claimed in claim 16, wherein the subsea tool or vehicle comprises a pull-in rope attached to a winch, the winch being operable to pay out the pull-in rope as the subsea tool or vehicle travels toward the frame.

* * * * *

UNITED STATES PATENT AND TRADEMARK OFFICE
CERTIFICATE OF CORRECTION

PATENT NO. : 7,086,807 B2  
APPLICATION NO. : 10/497066  
DATED : August 8, 2006  
INVENTOR(S) : Calum Mackinnon It is certified that error appears in the above-identified patent and that said Letters Patent is hereby corrected as shown below:

On Title Page Item (73) Assignees should read:

Technip France SA (FR); Technip Offshore UK Limited (GB)

Signed and Sealed this

Twenty-first Day of November, 2006

JON W. DUDAS  
*Director of the United States Patent and Trademark Office*